United States Patent [19]
Canale et al.

[11] 3,898,796
[45] Aug. 12, 1975

[54] AMBIENT COMPENSATING MEANS

[75] Inventors: Raymond P. Canale, Warren; Leon L. Brantman, Royal Oak, both of Mich.

[73] Assignee: Colt Industries Operating Corporation, New York, N.Y.

[22] Filed: Jan. 11, 1974

[21] Appl. No.: 432,566

Related U.S. Application Data

[62] Division of Ser. No. 207,063, Dec. 13, 1971, Pat. No. 3,777,481.

[52] U.S. Cl.......... 60/39.28 R; 137/505.37; 251/46; 251/61.4
[51] Int. Cl. ............................................. F02c 9/10
[58] Field of Search........... 60/39.28 R; 137/505.13, 137/505.36, 505.37

[56] References Cited
UNITED STATES PATENTS

| | | | |
|---|---|---|---|
| 3,316,713 | 5/1967 | Urban | 60/39.28 R |
| 3,332,232 | 7/1967 | Bevers | 60/39.28 R |
| 3,335,566 | 8/1967 | Aubert | 60/39.28 R |
| 3,365,883 | 1/1968 | Alberani | 60/39.28 R |

OTHER PUBLICATIONS

Chemical Abstracts, 74:42099X, (1971).
Chemical Abstracts, 53:6174C, (1959).
Chemical Abstracts, 50:4070B, (1956).
Chemical Abstracts, 49:15971G, (1955).
Chemical Abstracts, 48:13655C, (1954).

*Primary Examiner*—Clarence R. Gordon

[57] ABSTRACT

An ambient compensator, as for a turbine engine fuel control, has a valve interposed between a source of fluid signal pressure and related structure adapted to be acted upon by such fluid signal pressure, a first diaphragm member connected to the valve is exposed to the fluid signal pressure while a second diaphragm member is exposed to ambient pressure conditions and is also connected to the valve; the two diaphragm members cooperating to adjustably position the valve to thereby modify the magnitude of the signal pressure communicated to the related structure.

9 Claims, 3 Drawing Figures

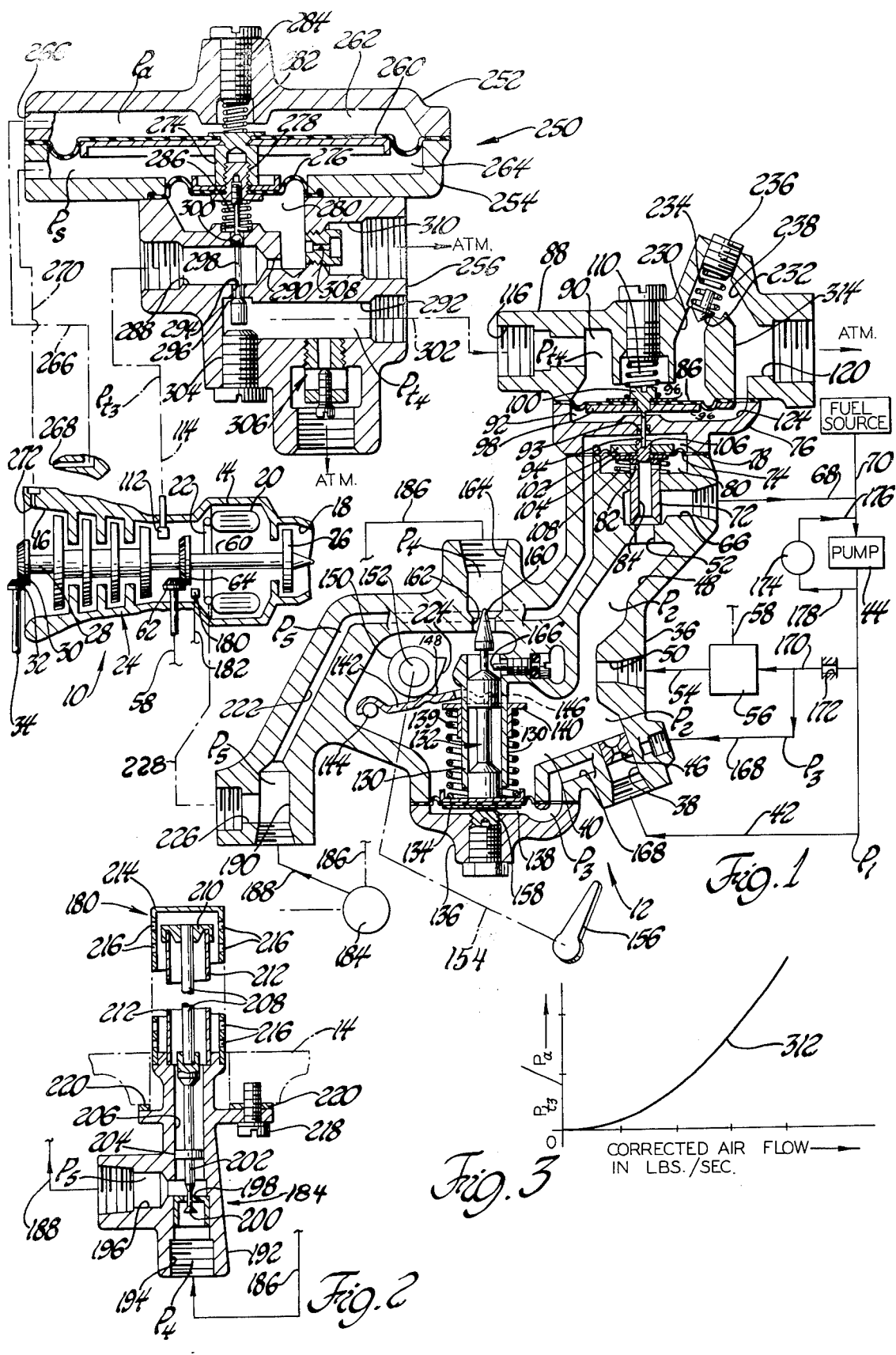

3,898,796

AMBIENT COMPENSATING MEANS

RELATED APPLICATION

This application is a division of our copending application Ser. No. 207,063 filed Dec. 13, 1971, now U.S. Pat. No. 3,777,481.

BACKGROUND OF THE INVENTION

If during acceleration of the gas generator section (compressor) of a free turbine type engine, or for high load conditions with a turboshaft type engine, a predetermined schedule of corrected turbine inlet temperature is exceeded a condition of compressor surge and/or engine over-temperature will result.

The prior art, has, as a matter of practice, designed fuel controls which would closely adhere to the predetermined schedule without exceeding it. However, by definition, the engines provided with such schedule type fuel controls were limited to a definite range of ambient temperatures and pressures (both minimum and maximum) as built into that particular fuel control.

Accordingly, the invention as disclosed and claimed herein is directed to the solution of the above as well as other related problems and is primarily concerned with the provision of means for extending the ambient range of engine operation without the occurrence of either compressor surge or engine overtemperature as with the prior art structures.

SUMMARY OF THE INVENTION

According to the invention, ambient compensating means as for use with a turbine engine fuel control which has means responsive to a signal pressure related to a pressure generated by the compressor of said turbine engine for governing the rate of metered fuel flow to said turbine engine, comprises valving means generally interposed between said means responsive to said signal pressure and said pressure generated by said compressor, and additional pressure responsive means operatively connected to said valving means, said additional pressure responsive means being responsive to changes in ambient conditions for adjustably positioning said valving means in accordance therewith and correspondingly modify the magnitude of said signal pressure.

Various general and specific objects and advantages of the invention will become apparent when reference is made to the following detailed description of the invention considered in conjunction with the accompanying drawings.

DESCRIPTION OF THE DRAWINGS

In the drawings, wherein for purposes of clarity certain details and/or elements may be omitted from one or more views:

FIG. 1 illustrates, in cross-section, a turbine engine equipped with a fuel control employing the invention;

FIG. 2 is an enlarged cross-sectional view of two elements shown schematically in FIG. 1; and FIG. 3 is a graph illustrating an assumed characteristic operating curve developed by plotting, along the horizontal axis, corrected air flow in lbs./second against the ratio of compressor discharge pressure to total ambient pressure ($P_{c3}/P_a$) along the vertical axis.

DESCRIPTION OF THE PREFERRED EMBODIMENT

Referring now in greater detail to the drawings, FIG. 1 illustrates a turbine engine 10 whose fuel supply is controlled by the fuel control 12 employing the invention. The engine 10 has a housing 14 with an air intake 16 and exhaust nozzle 18. A combustion or burner chamber 20, having a fuel distribution ring 22 therein, is located within the housing 14 between the compressor 24 and turbine 26. Power plant 10 is illustrated as being of the "solid shaft" type which has its compressor 24 connected as by a solid shaft to all of the turbine wheels or turbine wheel 26. The output power of such an arrangement as shown by engine 10 may be achieved by a pure jet output, as is often the case in aircraft applications, or, for example, by a mechanical transmission as schematically depicted by shaft 28, gears 30, 32 and output shaft 34. Turbine engine 10, of course, could be employed as a land-based stationary power plant, one employed in combination with either a land or water vehicle, as well as being employed as an aircraft power plant.

The fuel control 12, having a housing 36, is illustrated as comprising a fuel inlet conduit 38 which communicates generally between a general cavity or chamber 40 within housing 36 and a fuel supply conduit 42 communicating with a fuel pump 44. Inlet conduit 38 is provided with a restriction 46 the purpose of which will become apparent as the description progresses.

Cavity or chamber 40 communicates with a passageway 48 which, in turn, communicates with conduits 50 and 52. Conduit 50 communicates, as by conduit means 54, with speed sense means 56 operatively connected as by suitable motion transmitting means 58 to the shaft 60 as by means of meshed gears 62 and 64 of which gear 64 is connected to the shaft 60 and compressor 24 for rotation therewith.

Conduit 52 is in controlled communication with a bypass conduit 66 leading, as by suitable conduit means 68, to conduit means 70 upstream of the fuel pump 44. A bypass valve 72 operatively connected to a pressure responsive diaphragm assembly 74 is, as will become evident, normally urged downwardly toward a position closing communication between conduits 52 and 66. Diaphragm assembly 74 may be suitably retained between housing 36 and housing portion 76 so as to form two generally distinct but variable chambers 78 and 80. As will be noted, bypass valve 72 is provided with a plurality of radial passages 82 which continually complete communication between the interior 84 of bypass valve 72 and chamber 80.

A second diaphragm assembly 86 suitably secured between first housing portion 76 and a second housing portion 88, so as to form two generally distinct but variable chambers 90 and 92, is operatively connected to a motion transmitting pushrod 94 which is slidably received through a wall of housing portion 76 so as to have its opposite ends generally received within chambers 92 and 78.

As can be seen in FIG. 1, the diaphragm assembly 86 includes oppositely disposed diaphragm backing plates 96 and 98 which may be secured to each other, as to contain the diaphragm therebetween, by a suitable fastener 100 passing therethrough. Similarly, diaphragm assembly 74 may be provided with oppositely disposed diaphragm backing plates 102 and 104 which also may be secured to each other, as to contain the diaphragm therebetween, by a suitable fastener 106, which may be formed at one end of valve 72, passing therethrough. If desired, fastener 106 may be provided with a bore for receiving therein one end of pushrod 94. A compression spring 108, situated within chamber 80 normally resiliently urges the diaphragm assembly 74 upwardly while a compression spring 110 within chamber 90 resiliently urges the diaphragm assembly 86 downwardly thereby causing the pushrod 94 to be in abutting engagement at one end with the diaphragm assembly 74 and valve 72 and, at the other end, with diaphragm assembly 86. (As specifically illustrated, the motion or force transmitting pushrod 94 may actually abut against the fastener portions 100 and 106 of diaphragm assemblies 86 and 74, respectively.)

Chamber or cavity 40 has a cylindrical valve-guide portion 130 for slidably receiving therein a governor valve 132 suitably secured as at one end to a third pressure responsive diaphragm assembly 134 which may be suitably secured between housing 36 and cover member 136 in a manner forming a chamber 138 between the diaphragm assembly 134 and cover 136. A flanged sleeve-like variably positioned spring seat 140 is situated generally about the cylindrical valve-guide 130 in a manner so as to contain a compression spring 139 between seat 140 and diaphragm assembly 134. A lever 142, generally hinged as at 144, has a bifurcated end 146 which is adapted to straddle guide 130 in order to engage the upper surface of spring seat 140. Intermediate the ends thereof, lever 142 is provided with a cam-follower portion 148 adapted to engage the cam surface of a cam member 150 mounted on a shaft 152 for rotation therewith. As diagrammatically illustrated at 154, shaft 152 is operatively connected to a power selector lever 156 so that, for example, clockwise rotation of power lever 156 will cause corresponding rotation of shaft 152 and cam 150 thereby rotating lever 142 clockwise about pivot 144 in order to urge spring seat 140 downwardly thereby increasing the loading of compression spring 139. Such loading of spring 139, of course, urges diaphragm assembly 134 and governor valve 132, connected thereto, in the downward direction. A threadably adjustable stop 158 may be provided for limiting the degree of downward movement of diaphragm assembly 134 and governor valve 132.

Governor valve 132 is provided with a valving portion 160 which is adapted to cooperate with an orifice 162 in order to control the rate of fuel flow from chamber 40 to a conduit 164. As is apparent, the higher that valve 132 is positioned, the less flow there will be through orifice 162 for the same pressure differential. An adjustably positioned eccentric stop member 166 may be provided in order to provide a positive limit for the upward movement of governor valve 132.

Chamber 138, on the other side of diaphragm assembly 134, communicates as by a conduit 168 with a conduit 170 which communicates generally between said speed sense 56 and fuel supply conduit 42. As will be noted, conduit 170 contains a restriction 172 and conduit 168 communicates with conduit 170 at a point downstream of restriction 172.

The purpose of speed sense 56, in the embodiment disclosed, is to provide a pressure signal indicative of the speed of the gas producer section (compressor 24 and compressor drive turbine). One embodiment of the invention was successfully tested and operated employing a speed sense functionally equivalent to the speed sense as shown, for example, at 140 in U.S. Pat. No. 3,073,115 issued Jan. 15, 1963, to Warren H. Cowles et al. In such an arrangement, restriction 172 would be functionally equivalent to the restriction shown at 242 of said U.S. Pat. No. 3,073,115. Such arrangements and their operations are at this time generally well known in the art. It might also be pointed out at this time that pump 44 is provided with either an externally or internally formed pressure relief and check valve assembly as shown at 174 with suitable associated conduitry 176 and 178 communicating with valve 174 and respectively with conduits 70 and 42.

As shown in FIGS. 1 and 2, means may be provided for enabling the employment of another control parameter, that being the parameter of burner inlet temperature, for further qualifying the metered fuel flow to the engine. As schematically illustrated in FIG. 1, a temperature probe 180 is situated generally upstream of the burner section 20 so as to sense the temperature of the air of that point in order to further tailor the fuel requirements in accordance therewith. The temperature probe 180 is operatively connected by suitable motion transmitting means, as schematically illustrated at 182, to a valve assembly 184 which is serially connected between conduit 186, leading from conduit 164, and conduit 188 leading to conduit 190. Generally, the valve assembly 184 functions in a manner whereby a reduction in flow through the valve assembly 184 is experienced as probe 180 senses an increase in temperature.

FIG. 2 illustrates in greater detail one embodiment of a probe 180 and valve assembly 184 suitable for use in the arrangement of FIG. 1. Valve assembly 184 is illustrated as being comprised of a housing 192 having an inlet conduit 194 and an outlet conduit 196 generally between which is situated a valve orifice and seat 198. A valve member 200, carried as at the end of a stem portion 202, is situated so as to vary the effective area of orifice 198 depending on the relative proximity of the valve member 200. Stem 202, provided with a shoulder-like pilot portion 204 slidably received within a cylindrical guide-way 206 formed in housing 192, has its opposite end operatively secured to one end of a temperature sensing rod 208. The other end of rod 208 is secured to an end cap member 210 which cooperates with a recessed portion of housing 192 to axially contain therebetween a second temperature sensing member 212 of cylindrical configuration. Cylinder 212 and rod 208 have different coeficients of thermal expansion resulting in a predictable axial movement of valve member 200 per degree of temperature variation. The temperature probe 180 is also preferably provided with a protective shroud 214, which is perforated as at 216, in order to protect the rod 208 and cylinder 212 from possible damage. The entire assembly may be secured to the housing 14 of engine 10 by any suitable means such as the fastener and seal respectively illustrated at 218 and 220.

In addition to the above, ambient compensating means, provided as generally indicated at 250, comprises a housing assembly made up of, for example, housing sections 252, 254 and 256. A pressure responsive diaphragm assembly 260 is peripherally retained between housing sections 252 and 254 so as to define on opposite sides thereof distinct but variable chambers 262 and 264 with chamber 262 being in communication, via conduit means 266, with a pressure pick-up probe 268 is exposed to and sensing compressor inlet total pressure, $P_a$, while chamber 264 is placed in communication, via conduit means 270, with a pressure pick-up probe 272 exposed to and sensing total compressor inlet static pressure, $P_s$.

A centrally situated extension 274, secured at its upper end to diaphragm assembly 260, depends therefrom and has its other end secured to a second diaphragm assembly 276 as by means of an externally threaded member 278. Diaphragm assembly 276 has its upper surface exposed to chamber 264 and total inlet static pressure, $P_s$, while the lower surface of diaphragm assembly 276 is exposed to a chamber 280 formed within housing section 256. A first compression spring 282, situated generally within chamber 262, reacting against an adjustable spring seat 284, urges the diaphragm assemblies 260 and 276 downwardly while a second spring 286, situated generally within chamber 280, urges the diaphragm assemblies 260 and 276 upwardly.

A conduit 288 formed in housing section 256 communicating, via conduit means 114, with pressure pick-up probe 112, serves to communicate compressor discharge pressure, $P_{t3}$, to chamber 280 as by a calibrated passageway or restriction 290. A second conduit 292 is placed in controlled communication with conduit 288 as by means of a passageway 294 through which the flow is controlled by a valve member 296 carried by a valve stem 298 which has its other end threadably secured to the fastener 278. An intermediate portion of the stem 298 may be provided with a spherical like bearing and seal 300 slideably received in a cooperating passage formed in housing section 256. Conduit 292 is connected to conduit 116 as by suitable conduit means 302.

An adjustable stop member 304 is provided to limit the downward travel of valve 296 and a variably restricted bleed or vent assembly 306 may be provided in order to bleed off to atmosphere some of the pressure within conduit 292. In addition, a calibrated restriction 308 may be provided as to complete communication between chamber 280 and a conduit 310.

OPERATION

Fuel at a pressure $P_1$ is supplied by pump 44 through conduit 42 to conduit 38 and through muscles restriction 46 situated within conduit 38. An accompanying drop in pressure across restriction 46 results in the fuel within chamber 40 being at some pressure $P_2$ which is less than $P_1$. Further, it can be seen that conduit 168 supplies fuel from conduit 170 to chamber 138 at a pressure $P_3$ which is usually less than pressure $P_1$. However, it should be apparent that as the speed sense 56 senses greater speeds, the throttling valve contained therein becomes more nearly closed, resulting in the differential pressure $P_3-P_2$ increasing in magnitude. The ultimate maximum value of pressure $P_3$ would, of course, be pressure $P_1$ upstream of restriction 172. A further pressure drop occurs with the passage of fuel through the aperture defined by orifice 162 and metering valve 160, so that metered fuel downstream of orifice 162 is at a pressure $P_4$. A second pressure drop occurs with the passage of fuel through the aperture defined by orifice 198 and valve 200 so that the metered fuel downstream of orifice 198 is at a pressure $P_5$. An inspection of FIG. 1 will disclose that a pressure differential of $P_2-P_5$ exists across the metering orifice 162 and temperature modulated orifice 198 and that the same pressure differential of $P_2-P_5$ exists across the diaphragm assembly 74. (As shown, pressure $P_5$ is communicated to chamber 75 by suitable conduit means 222 in communication with conduit 190.) In other words, the force tending to open the bypass valve 72 is directly related to the pressure differential across the governor metering restriction and temperature modifying valve 184.

Further, it can be seen that a pressure differential of $P_3-P_2$ exists across pressure responsive diaphragm assembly 134. Accordingly, as pressure differential $P_3-P_2$ increases and approaches the value of $P_1-P_2$, as, for example, by the increased rotational speed of speed sense 56, a force is created across diaphragm assembly 134 tending to move governor valve 132 upwardly toward a more nearly fully closed position.

When the engine is being made ready for cranking, the power selector lever 156 is rotated to the desired power setting causing rotation of shaft 152 which, in turn, rotates cam 150 clockwise. Such rotation of cam 150 causes the contoured surface 224 to engage follower 148 and progressively urge lever 142 clockwise about pivot 144 thereby increasing the loading on spring 139 so as to urge diaphragm assembly 134 and governor valve 132 downwardly to provide a maximum effective flow area through orifice 162. As the engine 10 is being cranked, fuel pump 44 provides a supply of fuel through conduit 42 to chamber 40 at a pressure $P_2$, which increases in magnitude as the pump speed increases, so as to flow through orifice 162, conduits 164, 186 and 190. A conduit 226, formed in housing 36 effectively places conduit 190 in communication, as through suitable conduit means 228, with the fuel distribution ring 22. At this early stage of engine cranking or starting, the fuel pressure $P_2$ will be sufficient to cause diaphragm assembly 74 to move upwardly against the force transmitted by pushrod 94 thereby modulating the pressure differential of $P_2-P_5$.

Once ignition is achieved, the engine compressor 24 and turbine 26 begin to accelerate to achieve the speed and/or power requested by the position of the power selector lever 156. As a consequence of the increase in speed, fuel flow from pump 44 is increased with attendant increases in pressures $P_1$, $P_2$ and $P_3$ within supply conduit 42 and chambers 40 and 138, respectively.

Accordingly, it can be seen that the pressure differential of $P_3-P_2$ is increasing across diaphragm assembly 134 tending to overcome the force of spring 139 so as to urge governor valve 132 upwardly while, at the same time, the pressure differential $P_2-P_5$, which is also increasing, is being applied across diaphragm assembly 74 tending to move bypass valve 72 upward in opening direction.

Generally, compressor discharge pressure, $P_{t3}$, varies as the square of the speed of the compressor 24; the pressure signal, $P_3$, varies as the square of the speed being sensed; and the weightrate of fuel flow, $W_f$, through orifice 162 varies as the square root of the pressure differential $P_2-P_4$.

Now, without regard to the ambient compensator 250, it can be seen that as engine speed (compressor speed) increases, pressure within chambers 90, 80, 40 and 138 also increases in accordance with the parameters governing such pressures. Therefore, it can be seen that as compressor speed is increasing, speed sense differential pressure $P_3-P_2$ causes the gradual upward movement of governor valve 132 when the force of spring 139 is overcome, thereby reducing the effective cross-sectional area of orifice 162. Due to the reduced cross-sectional area of orifice 162, the pressure differential $P_2-P_4$ (and therefore the pressure differential $P_2-P_5$) tends to increase, causing a greater upward force to be applied to bypass valve diaphrahm 74. When the differential of $P_2-P_5$ increases to a predetermined value (for the conditions established) the resulting upward force on diaphragm assembly 74 equals and then to a slight degree exceeds the force transmitted by pushrod 94 so as to open bypass valve 72 in order to bypass fuel from chamber 40 and conduit 48 through conduit 52 to the inlet side of the fuel pump 44 as by conduit means 66, 68 and 70. Bypass valve 72 will be moved toward and away from the closed position in order to maintain the particular pressure differential of $P_2-P_5$ so as to keep the engine operating at the governed steady state condition.

If it is now assumed that it is desired to increase the output of the engine from some first point of steady state operation to a second point of steady state operation, the only thing that needs to be done is to rotate the power selector lever 156 further to the right in order to cause an additional incremental clockwise rotation of shaft 152 and cam 150 so as to have the cam surface 224 further depress end 146 of lever 142. This, in turn, causes a greater loading on spring 139 and diaphragm assembly 134 to the point that the force created by pressure differential $P_3-P_2$ is overcome thereby moving governor valve 132 downwardly increasing the effective flow area of orifice 162.

As a consequence, increased fuel flow to the engine is achieved resulting in increases in the compressor speed, compressor discharge pressure, $P_{t3}$, and speed sense differential pressure $P_3-P_2$. The increase in compressor discharge pressure, $P_{t3}$, ultimately causes diaphragm assembly 86 to exert a further force on pushrod 94 against diaphragm assembly 74 so as to tend to close the bypass valve 72 and maintain the differential pressure of $P_2-P_4$ in prescribed relationship to the effective compressor discharge pressure. As before, when pressure differential $P_3-P_2$ increases sufficiently, governor valve 132 is moved upwardly an amount sufficient to meter the desired weight rate of fuel flow and bypass valve 72 is moved upwardly so as to maintain the desired value of the pressure differential $P_2-P_4$ across the metering orifice 162.

For a controlled deceleration, the power selector lever 156 is rotated to a lower counter-clockwise position thereby permitting end 146 of lever 142 to move to its uppermost position. This reduces the load on spring 139 and permits $P_3-P_2$ to move governor valve 132 to its uppermost position so as to, for example, engage the minimum fuel flow abutment or stop 166.

Now considering the ambient compensator assembly 250, and for the moment assuming that restriction 308 is not employed in the invention, it can readily be seen that conduit 288 and chamber 280 will be at a pressure, $P_{t3}$, and that conduit 292 will be at a reduced pressure $P_{t4}$ dependent upon the degree of opening of valve 296 and the degree of bleed permitted by bleed restriction 306. Generally, when, for example, ambient altitude or temperature increases, the value of pressure $P_a$ decreases, as does the value of static pressure, $P_s$, and the ratio of $P_a/P_s$ remains essentially constant. Further, at assumed constant compressor speed, the absolute value of compressor discharge pressure, $P_{t3}$, decreases with an increase in either or both altitude and temperature. At the same time, the ratio of $P_{t3}/P_a$ decreases with an increase in either temperature or altitude. Therefore, generally, in view of the above, it can be seen that as either ambient temperature or altitude increases, the compensator valve 296 moves toward the closed condition further reducing the valve of $P_{t4}$ and permitting bypass valve 72 to open at a lesser absolute value of compressor discharge pressure thereby effectively reducing the weight rate of metered fuel flow and preventing, for example, an over-temperature condition in the engine. On the other hand, as either ambient temperature or altitude decreases, the compensator valve 296 moves toward the fully opened position thereby effectively increasing the value of $P_{t4}$ and permitting bypass valve 72 to remain closed until a higher absolute value of compressor discharge pressure is attained thereby increasing the rate of metered fuel flow to the engine.

The specific relationships of the components and pressures in the ambient compensator 250 may be better understood from the following equations:
Where:
$P_a$ = compressor inlet total pressure
$P_s$ = compressor inlet static pressure
$P_{t3}$ = compressor discharge total pressure
$A_1$ = effective area of diaphragm 260 and
$A_2$ = effective area of diaphragm 276

$$(P_a - P_s) \cdot A_1 = (P_{t3} - P_s) \cdot A_2$$

$$\left(1 - \frac{P_s}{P_a}\right) \cdot A_1 = \left(\frac{P_{t3}}{P_a} - \frac{P_s}{P_a}\right) \cdot A_2$$

$$\left(1 - \frac{P_s}{P_a}\right)\left(\frac{A_1}{A_2}\right) = \frac{P_{t3}}{P_a} - \frac{P_s}{P_a}$$

$$\left(1 - \frac{P_s}{P_a}\right)\left(\frac{A_1}{A_2}\right) + \frac{P_s}{P_a} = \frac{P_{t3}}{P_a}$$

or $$\frac{P_{t3}}{P_a} = \frac{P_s}{P_a}\left(1 - \frac{A_1}{A_2}\right) + \frac{A_1}{A_2}$$

In view of the above, it can be seen that $P_s/P_a$ being a unique function of corrected air flow (The term "corrected" air flow indicates that the actual rate of air flow at the various $P_{t3}/P_a$ ratios is expressed in terms of corresponding air flow at standard conditions assumed, for example, to be 60° F. and 14.7 lbs./sq. inch), the compensator operating parameters are identical to engine operating parameters. Accordingly, by an appropriate dimensional selection of $A_1$ and $A_2$, a characteristic operating curve can be generated which will pass through at least one selected engine operating point and may closely follow the desired engine acceleration characteristic.

For example, referring to FIG. 3, if it is assumed that the curve 312 represents the compressor surge line of a particular engine compressor, as determined by plotting the ratio of compressor discharge pressure, $P_{t3}$, to total ambient inlet pressure, $P_a$, against corrected air flow in pounds per second, then the compensator 250 may be made to follow, in its somewhat neutral state, the configuration of such curve 312. Any time that the corrected air flow in pounds per second, lb./sec., increases without the corresponding increase in $P_{t3}/P_a$, as dictated by the curve 312, the compensator valve 296 moves toward its fully open position thereby enabling an increase in the rate of metered fuel flow to the engine. Likewise, whenever the corrected air flow decreases without the corresponding decrease in the ratio $P_{t3}/P_a$, as dictated by the curve 312, the compensator valve 296 moves toward its closed position thereby reducing the rate of metered fuel flow to the engine.

In view of the preceding, it should be apparent that the invention as herein disclosed effectively extends the ambient range of proper engine operation in that it permits the proper operation of such a turbine engine at both higher and lower ambient temperatures and pressures than it could otherwise operate with an associated fuel control of a fixed metering schedule.

As previously mentioned, restriction 308 may or may not be employed; however, use of restriction 308 enables greater shaping of the characteristic operating curve by enabling chamber 280 to be at a pressure dependent on the rate of flow through the sized passageway 290 and restriction 308 which combine to form a flow through system. Further, even though springs 282 and 286 may be balanced and of such a spring rate as to provide a negligible effect in the overall system, such springs 282 and 286 may in fact by employed to provide an unbalanced spring force in either direction. Such an unbalanced spring force would provide a bias to the resulting characteristic curve and vary with altitude and temperature. In other words, with reference to FIG. 3, such unbalanced spring forces may be employed to shift the curve 312 to the right or left.

Bleed restriction 306 has been illustrated as being physically situated within housing section 256. However, it should be made clear that if desired, functionally equivalent bleed restriction could be placed through wall 314 of housing section 88 so as to communicate between chamber 90 and conduit 120 while conduit 292 would be made to have no direct bleed to atmosphere. Further, it is possible to have such a bleed restriction placed through wall 314 and at the same time still have a bleed such as 306 situated as illustrated.

Although only a preferred form of the invention has been illustrated and described, it is apparent that other embodiments and modifications of the invention are possible within the scope of the appended claims.

We claim:

1. Ambient compensating means for use with a turbine engine fuel control which has means responsive to a signal pressure related to a pressure generated by the compressor of said turbine engine for governing the rate of metered fuel flow to said turbine engine, said ambient compensating means comprising valving means adapted to be interposed between said means responsive to said signal pressure and said pressure generated by said compressor, and additional pressure responsive means operatively connected to said valving means, said additional pressure responsive means being adapted to be responsive to changes in engine airflow as affected by ambient conditions for adjustably positioning said valving means in accordance therewith and correspondingly modify the magnitude of said signal pressure.

2. Ambient compensating means according to claim 1, wherein said additional pressure responsive means comprises second pressure responsive means and third pressure responsive means, said second pressure responsive means being adapted to be responsive to the differential between ambient static pressure and ambient total pressure, and said third pressure responsive means being adapted to be responsive to the differential between ambient static pressure and the pressure generated by said compressor.

3. Ambient compensating means according to claim 1, and further comprising housing means, chamber means formed in said housing means, a first pressure responsive diaphgram situated generally within said chamber means so as to define on opposite sides of said diaphragm first and second distinct but variable chamber portion a second pressure responsive diaphragm having one side thereof defining a portion of a wall of said second chamber portion and having a second side opposite to said one side defining a portion of a wall of a third chamber portion formed in said housing means, first conduit means formed through said housing means and having an inlet and an outlet, second conduit means formed in said housing means and adapted for completing communication between said first chamber portion and a source of ambient total pressure, third conduit means formed in said housing means and adapted for completing communication between said second chamber portion and a source of inlet ambient static pressure of the inlet of said turbine engine, said inlet of said first conduit means being adapted for completing communication with a source of said pressure generated by said compressor, said outlet of said first conduit means being adapted for communication with said means responsive to said signal pressure, passage means formed in said housing means for completing communication between said first conduit means and said third chamber portion, and valving means situated generally within said first conduit means for controlling the rate of flow therethrough and being thereby adapted for variably determining the magnitude of the signal pressure downstream thereof, said valving means being operatively connected to and variably positionable by said first and second diaphragms as said first and second diaphragms move in response to the pressures within said first second and third chamber portions.

4. Ambient compensating means according to claim 3, wherein said first and second diaphragms are secured to each other for collective movement, and further comprising first resilient means urging said first and second diaphragms in a direction tending to fully open said valving means, and second resilient means urging said first and second diaphragms in a direction tending to fully close said valving means.

5. Ambient compensating means according to claim 4, wherein said first and second resilient means have substantially identical spring rates.

6. Ambient compensating means according to claim 4, wherein said first and second resilient means are initially preloaded to substantially the same preload force.

7. Ambient compensating means according to claim 3, wherein said second diaphragm is of an effective area substantially less than the effective area of said first diaphragm.

8. Ambient compensating means according to claim 3, and further comprising pressure bleed means communicating with said first conduit means downstream of said valving means for venting a portion of said signal pressure to an area of relatively low pressure in order to thereby reduce the magnitude of said signal pressure downstream of said valving means.

9. Ambient compensating means according to claim 3, and further comprising pressure bleed means communicating with said third chamber portion for venting a portion of the pressure in said third chamber portion to an area of relatively low pressure.

* * * * *